United States Patent [19]

Verebi, Jr.

[11] Patent Number: 5,993,014
[45] Date of Patent: Nov. 30, 1999

[54] DAY-NIGHT REAR VIEW MIRROR

[76] Inventor: Steven Verebi, Jr., 27060 Tamsen Ave. NW., Poulsbo, Wash. 98370-9509

[21] Appl. No.: 08/964,952

[22] Filed: Nov. 5, 1997

[51] Int. Cl.[6] .............................. G02B 5/08; G02B 27/00
[52] U.S. Cl. .......................... 359/607; 359/601; 359/604
[58] Field of Search .................................... 359/601–609, 359/871–879, 227; 74/502.1

[56] References Cited

U.S. PATENT DOCUMENTS

| | | | |
|---|---|---|---|
| 1,913,874 | 6/1933 | Folberth et al. | 359/604 |
| 3,542,455 | 11/1970 | Jensen | 359/605 |
| 3,625,597 | 12/1971 | Jones | 359/606 |
| 3,722,984 | 3/1973 | Brean | 359/605 |
| 3,748,025 | 7/1973 | Van Putten, Jr. | 359/605 |
| 3,811,755 | 5/1974 | Carson | 359/604 |
| 3,836,235 | 9/1974 | Russell | 359/605 |
| 3,924,938 | 12/1975 | Carson | 359/605 |
| 4,078,859 | 3/1978 | Sharett | 359/604 |
| 4,103,560 | 8/1978 | Stoffel et al. | 359/607 |
| 4,614,404 | 9/1986 | Greene et al. | 359/604 |
| 5,028,120 | 7/1991 | Taylor | 359/227 |
| 5,450,246 | 9/1995 | Jain | 359/606 |

*Primary Examiner*—Thong Nguyen

[57] ABSTRACT

A housing includes a sheet of glass on one face thereof. A pivot assembly is mounted within the housing, adjacent one end of the sheet of glass. A mirror is attached at one end thereof to the pivot assembly. The housing is adapted to be mounted to a side of a vehicle such that the pivot assembly is above a free end of the mirror. A control cable has one end thereof attached to the mirror, and another end thereof attached to a control cable actuator. The control cable is configured to translate in a first direction to pull the free end of the mirror away from the sheet of glass, pivoting the mirror about the pivot assembly. The free end of the mirror is permitted to move back toward the sheet of glass under the influence of gravity when the control cable is translated in a second direction which is opposite the first direction, until the mirror is substantially parallel to the sheet of glass.

5 Claims, 4 Drawing Sheets

DAY-NIGHT REAR VIEW MIRROR

BACKGROUND OF THE INVENTION

1. Field of the Invention

The present invention relates to day-night mirror assemblies, particularly those operated by remote control.

2. Description of the Related Art

Day-night mirror assemblies are known in the prior art. U.S. Pat. No. 3,722,984 to Brean shows a day-night mirror assembly using a motorized, geared drive to pivot a mirror toward and away from a sheet of glass. The mirror is powered in both directions, toward and away from the sheet of glass.

U.S. Pat. No. 3,625,597 to Jones shows a day-night mirror assembly using a pair of control cables to pivot a prismatic mirror in two directions. The mirror is positively driven in both directions by the action of the cables.

A drawback with these inventions is that the complicated hardware involved is expensive. Rear view mirrors are often knocked off when pulling into a garage because they stick outward from the sides of the vehicle. This can cause damage to the rear view mirror itself, requiring replacement. Obviously, the replacement costs are even higher when using the day-night mirrors of the prior art.

What is needed is a day-night mirror with simplified construction to cut down on the expense of replacement.

SUMMARY OF THE INVENTION

The day-night rear view mirror assembly of the present invention includes a housing having a sheet of glass on one face thereof. A pivot assembly is mounted within the housing, adjacent one end of the sheet of glass. A mirror is attached at one end thereof to the pivot assembly. The housing is adapted to be mounted to a side of a vehicle such that the pivot assembly is above a free end of the mirror.

A control cable has one end thereof attached to the mirror, and another end thereof attached to a control cable actuator. The control cable is configured to translate in a first direction to pull the free end of the mirror away from the sheet of glass, pivoting the mirror about the pivot assembly. In this position, the bright reflection from the mirror is directed downward, away from a driver's eyes, and the dim reflection from the sheet of glass is directed toward the driver's eyes. This is the night position.

The free end of the mirror is permitted to move back toward the sheet of glass under the influence of gravity when the control cable is translated in a second direction which is opposite the first direction, until the mirror is substantially parallel to the sheet of glass. In this position, the bright reflection from the mirror is reflected toward the driver's eyes. This is the day position.

Because the mirror moves back toward the sheet of glass under the influence of gravity, only one control cable is required, for pulling the free end of the mirror away from the sheet of glass. No additional control cable or spring is required to pull the free end of the mirror back toward the sheet of glass.

Still further features and advantages will become apparent from the ensuing description and drawings.

DETAILED DESCRIPTION

Figure 1:
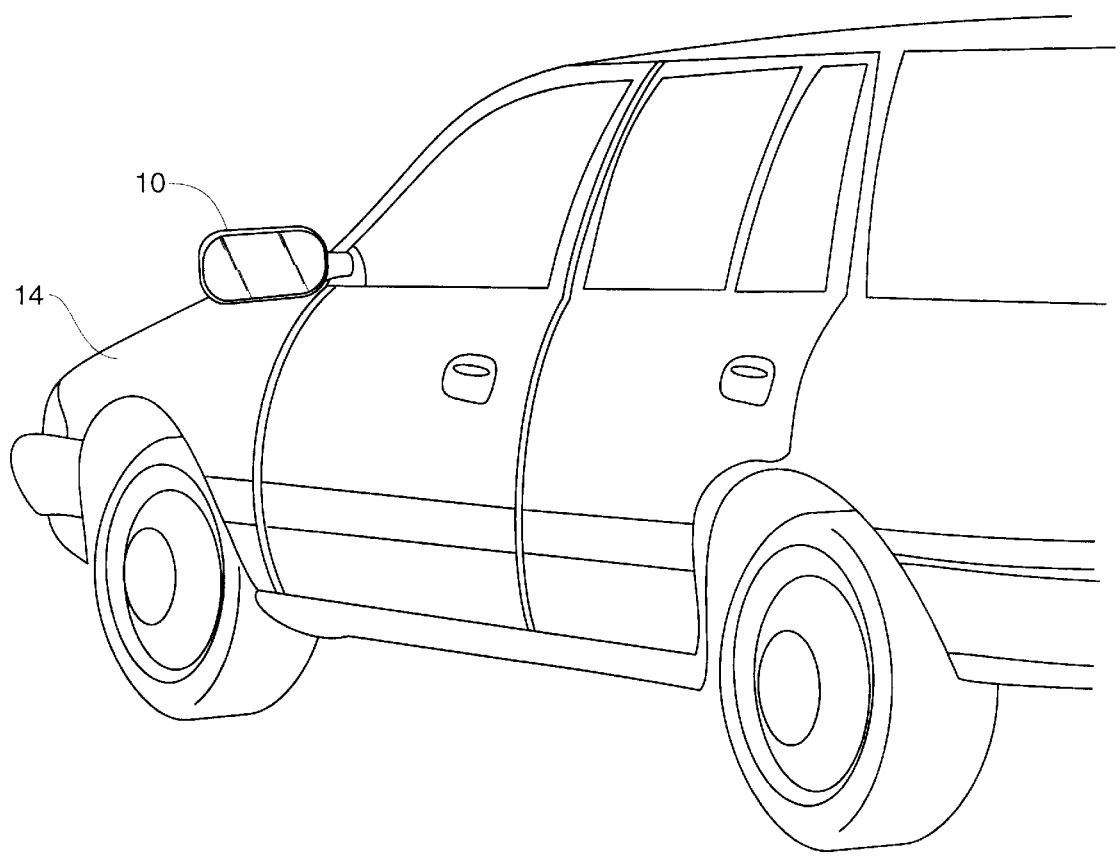
FIG. 1 is a perspective view of a housing of a vehicle mirror assembly, mounted to a side of a vehicle.
Figure 2:
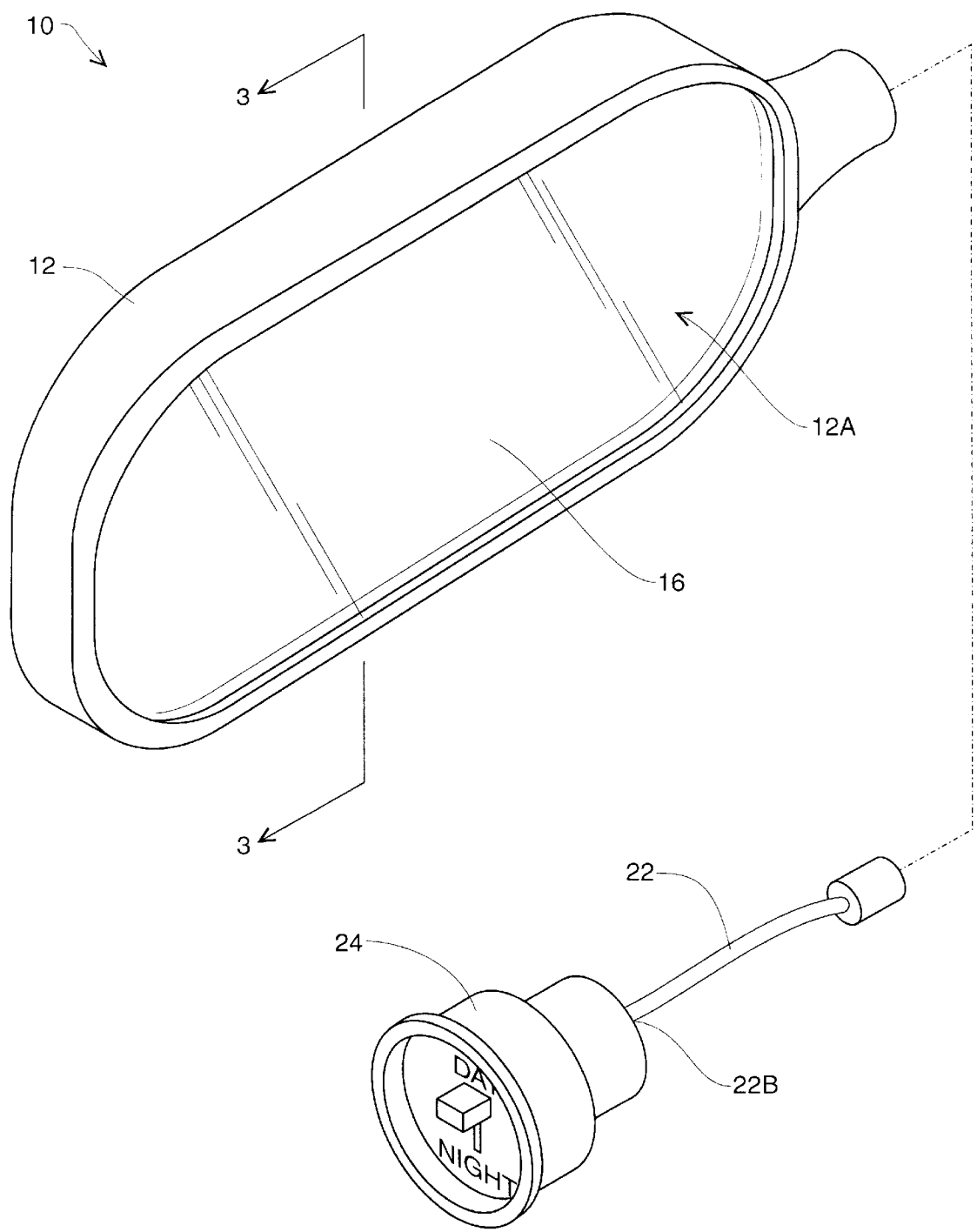
FIG. 2 is a perspective view of the mirror assembly, shown without the vehicle.
Figure 3:
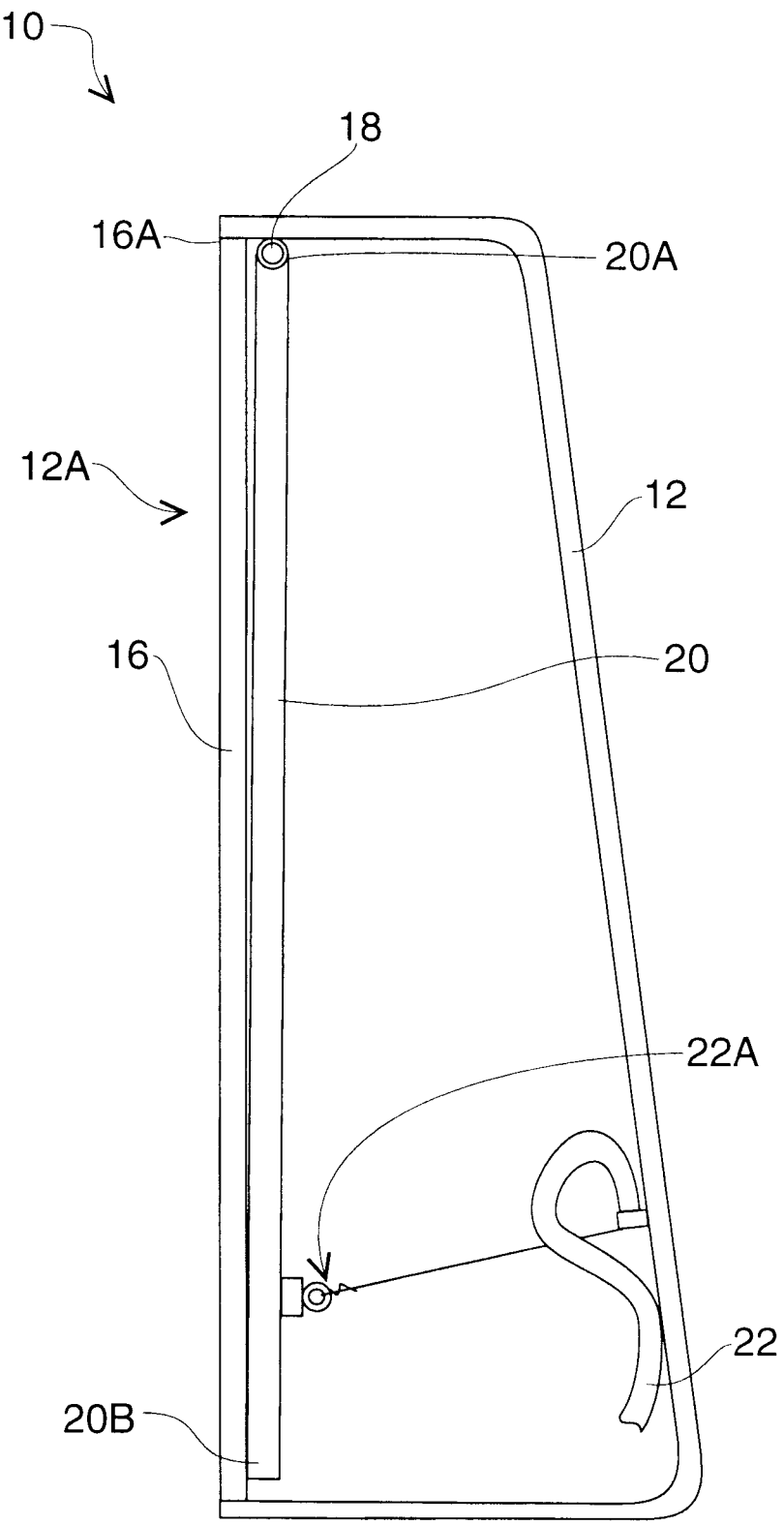
FIG. 3 is a cross-sectional view taken along line 3—3 of FIG. 2, showing a mirror of the mirror assembly in a first position.

FIG. 1 is a perspective view of a housing 12 of a vehicle mirror assembly 10, mounted to a side of a vehicle 14. FIG. 2 is a perspective view of the mirror assembly 10, shown without the vehicle 14. FIG. 3 is a cross-sectional view taken along line 3—3 of FIG. 2. Referring to FIGS. 1–3, the mirror assembly 10 of the present invention includes the housing 12 having a sheet of glass 16 on one face 12A thereof. A pivot assembly 18 is mounted within the housing 12, adjacent one end 16A of the sheet of glass 16. A mirror 20 is attached at one end 20A thereof to the pivot assembly 18. The housing 12 is adapted to be mounted to a side of the vehicle 14 such that the pivot assembly 18 is above a free end 20B of the mirror 20.

A control cable 22 has one end 22A thereof attached to the mirror 20, and another end 22B thereof attached to a control cable actuator 24. The actuator 24 may be of any conventional design known in the art. For example, and not by way of limitation, U.S. Pat. No. 3,625,597 to Jones shows an actuator (element 16, FIG. 1). Although the Jones actuator controls two control cables, the actuator of the present invention controls only one cable. The Jones actuator can easily be adapted by one skilled in the art to control the present invention.

The actuator 24 may be mounted within the vehicle 14, or may be mounted on the mirror assembly 10.

Figure 4:
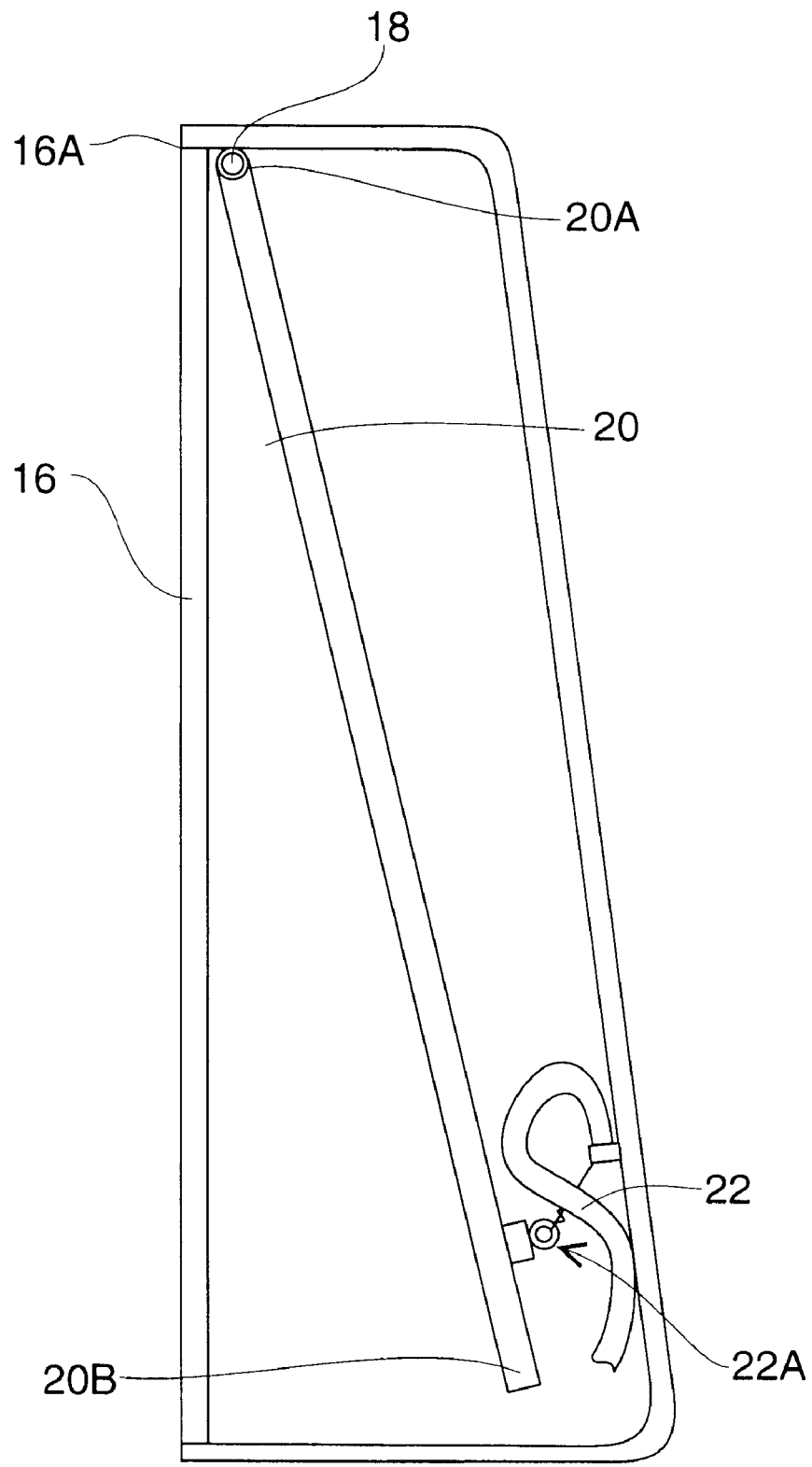
FIG. 4 is a cross-sectional view similar to FIG. 3, showing the mirror in a second position.

FIG. 3 shows the mirror 20 in a first position in which the mirror 20 is substantially parallel to the sheet of glass 16. FIG. 4 is a cross-sectional view similar to FIG. 3, except that it shows the mirror 20 in a second position. Referring to FIGS. 3 and 4, the actuator 24 is configured in a known manner to translate the control cable 22 in a first direction to pull the free end 20B of the mirror 20 away from the sheet of glass 16, pivoting the mirror 20 about the pivot assembly 18, until the mirror 20 reaches the second position shown in FIG. 4.

The free end 20B of the mirror 20 moves back toward the sheet of glass 16 under the influence of gravity when the control cable 22 is translated in a second direction which is opposite the first direction, until the mirror 20 is substantially parallel to the sheet of glass 16, as shown in FIG. 3.

For use with trucks, the components of the mirror 10 can be rearranged to direct the reflection of the mirror 20 upward in the night position, to direct glare away from the eyes of drivers of on-coming automobiles. In such a configuration, the pivot assembly 18 would be positioned below the free end 20B of the mirror 20, and the cable 22 would be configured to pull the free end 20B toward the sheet of glass 16 when the cable 22 is translated in a first direction, and the free end 20B would be permitted to move away from the sheet of glass 16 under the influence of gravity when the cable 22 translates in a second direction.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. For example, and not by way of limitation, the control cable 22 can be replaced by other, similar structure. In addition, the control cable 22 could be electrically driven instead of manually.

Accordingly, the scope of the invention is to be limited only by the following claims and their legal equivalents.

The invention claimed is:

1. A day-night rear view mirror assembly comprising:
 a. a housing having a sheet of glass on one face thereof;
 b. a pivot assembly mounted within the housing, adjacent one end of the sheet of glass;
 c. a mirror attached at one end thereof to the pivot assembly; and
 d. control means for pulling a free end of the mirror in a first direction, pivoting the mirror about the pivot assembly, and for permitting the free end of the mirror to move in a second direction which is opposite the first direction, the free end thus moving toward and away from the sheet of glass, wherein only gravity urges the free end of the mirror in the second direction.

2. A day-night rear view mirror assembly comprising:
 a. a housing having a sheet of glass on one face thereof;
 b. a pivot assembly mounted within the housing, adjacent one end of the sheet of glass;
 c. a mirror attached at one end thereof to the pivot assembly; and
 d. control means for pulling a free end of the mirror away from the sheet of glass, pivoting the mirror about the pivot assembly, and for permitting the free end of the mirror to move back toward the sheet of glass until the mirror is substantially parallel to the sheet of glass, wherein only gravity urges the free end of the mirror back toward the sheet of glass.

3. The day-night rear view mirror assembly of claim 2, wherein the housing is adapted to be mounted to a side of a vehicle such that the pivot assembly is above the free end of the mirror.

4. The day-night rear view mirror assembly of claim 3, wherein the control means comprises only one control cable, the control cable having one end thereof attached to the mirror, and another end of the control cable attached to a control cable actuator.

5. A day-night rear view mirror assembly comprising:
 a. a housing having a sheet of glass on one face thereof;
 b. a pivot assembly mounted within the housing, adjacent one end of the sheet of glass;
 c. a mirror attached at one end thereof to the pivot assembly;
 d. the housing adapted to be mounted to a side of a vehicle such that the pivot assembly is above a free end of the mirror;
 e. only one control cable, the control cable having one end thereof attached to the mirror, and another end of the control cable attached to a control cable actuator;
 f. the control cable configured to translate in a first direction to pull the free end of the mirror away from the sheet of glass, pivoting the mirror about the pivot assembly; and
 g. the free end of the mirror permitted to move back toward the sheet of glass when the control cable is translated in a second direction which is opposite the first direction, until the mirror is substantially parallel to the sheet of glass, wherein only gravity urges the free end of the mirror back toward the sheet of glass.

* * * * *